United States Patent [19]

Niimi et al.

[11] Patent Number: 5,073,449
[45] Date of Patent: Dec. 17, 1991

[54] MAGNETIC RECORDING MEDIUM AND METHOD FOR PRODUCING THE SAME

[75] Inventors: Hideaki Niimi; Noboru Isoe, both of Toride; Kunio Wakai, Ibaraki; Tetsuo Mizumura, Toride, all of Japan

[73] Assignee: Hitachi Maxell Ltd., Osaka, Japan

[21] Appl. No.: 171,174

[22] Filed: Mar. 21, 1988

Related U.S. Application Data

[63] Continuation of Ser. No. 851,464, Apr. 14, 1986, abandoned.

[30] Foreign Application Priority Data

Apr. 15, 1985 [JP] Japan .................. 60-78562

[51] Int. Cl.$^5$ .............................................. G11B 23/00
[52] U.S. Cl. .................................. 428/336; 427/130; 427/132; 428/694; 428/695; 428/900
[58] Field of Search ............... 428/336, 694, 702, 900, 428/695; 427/130, 131

[56] References Cited

U.S. PATENT DOCUMENTS

| | | | |
|---|---|---|---|
| 3,460,968 | 8/1969 | Bate et al. | 428/900 |
| 4,124,736 | 11/1978 | Patel et al. | 427/130 |
| 4,239,835 | 12/1980 | Iijima et al. | 428/900 |
| 4,385,098 | 5/1983 | Sugita et al. | 428/694 |
| 4,388,367 | 6/1983 | Chen et al. | 428/323 |
| 4,487,812 | 12/1984 | Kawasaki et al. | 428/928 |
| 4,504,327 | 3/1985 | Inomata et al. | 428/900 |
| 4,511,635 | 4/1985 | Nagao et al. | 428/694 |
| 4,540,600 | 9/1985 | Kobayashi et al. | 427/131 |
| 4,554,217 | 11/1985 | Grimm et al. | 427/131 |
| 4,565,734 | 1/1986 | Arai et al. | 428/694 |
| 4,596,735 | 6/1986 | Noguchi et al. | 428/694 |
| 4,609,962 | 9/1986 | Arai et al. | 428/900 |
| 4,610,911 | 9/1986 | Opfer et al. | 428/694 |

FOREIGN PATENT DOCUMENTS

0053811 12/1981 European Pat. Off. .

Primary Examiner—Paul J. Thibodeau
Attorney, Agent, or Firm—Birch, Stewart, Kolasch & Birch

[57] ABSTRACT

A magnetic recording medium comprising a substrate and a ferromagnetic metal layer, wherein the ferromagnetic metal layer includes hydrated amorphous cobalt oxide, a X-ray photoelectron spectra which is characterized in that, in the $Co_{2p}$ spectrum, a ratio of a peak height at 785.9±0.3 eV to that at 780.0±0.3 eV is 40/100 or less when a background (BG) line is drawn between lower energy side leading edge points of peaks at 780.0±0.3 eV ($2p_{3/2}$) and 795.6±0.3 eV ($2p_{\frac{1}{2}}$) and, in the $O_{1s}$ spectrum, a ratio of a peak height at 529.3±0.4 eV to that at 530.8±0.4 eV is from 100:110 to 100:50 when a background line is drawn between the lower energy side leading edge point and the higher energy side leading edge point of a complex peak at 530.5±2.5 eV from which the peaks at 529.3±0.4 eV and 530.8±0.4 are derived by peak synthesis, which has good corrosion and wear resistance.

18 Claims, 9 Drawing Sheets

MAGNETIC RECORDING MEDIUM AND METHOD FOR PRODUCING THE SAME

This application is a continuation of application Ser. No. 851,464 filed on Apr. 14, 1986, now abandoned.

BACKGROUND OF THE INVENTION

1. Field of the Invention

The present invention relates to a magnetic recording medium and a method for producing the same. More particularly, it relates to a magnetic recording medium which comprises a magnetic layer consisting of a thin layer of ferromagnetic metal material containing cobalt on a substrate and which has a high corrosion resistance, low coefficient of friction and improved operating stability.

2. Discussion of the Related Art

A magnetic recording medium comprising a magnetic layer consisting of a thin layer of ferromagnetic metal material containing cobalt as a main magnetic component is generally produced by applying metal cobalt or an alloy of cobalt on a substrate film by vacuum deposition or sputtering. Although such a magnetic recording medium is especially suitable for high density recording, the surface of the medium is highly susceptible to moist atmospheric corrosion and corroded materials formed on the surface cause a reduction in the good magnetic properties of the medium and/or severe deterioration of its lubricating characteristics.

To improve corrosion resistance of a ferromagnetic metal thin layer containing cobalt, it has been proposed to treat a magnetic recording medium comprising a ferromagnetic metal layer in a high temperature high humidity atmosphere, for example at 70° C., and 80%RH so as to form crystalline $Co_3O_4$ on the surface (cf. U.S. Pat. No. 3,460,968).

However by such treatment of the ferromagnetic metal layer in the high temperature high humidity atmosphere, the corrosion resistance and lubricating performance are not satisfactorily improved. If the ferromagnetic metal layer is stored at 60° C., 90%RH for a week, a corroded layer of cobalt (II) hydroxide (Co(OH)$_2$) is formed so that the coefficient of friction of the magnetic recording medium is increased on standing and wear resistance is decreased. Thus, an increase in the coefficient of friction due to the corroded material is not prevented.

SUMMARY OF THE INVENTION

One object of the present invention is to provide a magnetic recording medium with good corrosion resistance.

Another object of the present invention is to provide an excellent magnetic recording medium with good wear resistance.

A further object of the present invention is to provide a method for producing a magnetic recording medium with good corrosion and wear resistance on a mass production basis.

DETAILED DESCRIPTION OF THE INVENTION

As a result of the extensive study, it has been found that an outer skin layer of a ferromagnetic metal layer is passivated when the magnetic layer consisting of a ferromagnetic metal thin film formed on the substrate is oxidized at a temperature of from 40° to 90° C., at a relative humidity of less than 50%, preferably not higher than 45%. X-ray photoelectron spectroscopic (XPS) analysis of the resulting passivated skin layer of the ferromagnetic metal layer revealed that there was formed a cobalt compound which is characterized in that, in the $Co_{2p}$ spectrum, a ratio of a peak height at 785.9±0.3 eV to that at 780.0±0.3 eV is 40/100 or less when a background (BG) line is drawn between lower energy side leading edge points of peaks at 780.0±0.3 eV ) and 795.6±0.3 eV ($2p_{1/2}$) and, in the $O_{1s}$ spectrum, a ratio of a peak height at 529.3±0.4 eV to that at 530.8±0.4 eV is from 100:110 to 100:50 when a background line is drawn between the lower energy side leading edge point and the higher energy side leading edge point of a complex peak at 530.5±2.5 eV from which the peaks at 529.3±0.4 eV and 530.8±0.4 are derived by computer peak synthesis. In addition, according to an analysis of crystallinity of the passivated layer by reflection electron diffraction, no crystalline phase due to passivated layer was detected and it was concluded that the cobalt compound contained in the passivated layer was amorphous.

Further study of the passivated outer skin layer of the ferromagnetic metal layer has revealed that a homogeneously passivated layer can be formed on a whole surface of a magnetic recording medium comprising a ferromagnetic metal thin layer containing cobalt by exposing the medium to an atmosphere containing water vapor at a partial pressure of $10^{-3}$ Torr or higher so that the metal thin layer absorbs the water, evacuating the medium under a reduced pressure of 100 Torr or lower and then slowly oxidizing the metal layer in a dry atmosphere containing oxygen at a partial pressure of 100 torr or higher. This method allows for the mass production of a magnetic recording medium having a homogeneously passivated layer over the whole surface of the ferromagnetic metal layer of the recording medium.

It has also been found that, when a skin layer of the ferromagnetic layer with a thickness of about 100Å from the surface contains oxygen in an amount of about 20 to 50 atomic percent on the average, wear resistance of the passivated magnetic recording medium is considerably improved.

In addition, it has been found that, when a lubricating layer comprising an aliphatic compound or an organic fluorine-containing compound is formed on the passivated layer, the coefficient of friction is decreased and thus the durability of the magnetic recording medium is improved.

The present invention will be illustrated by way of example with reference to the accompanying drawings.

Figure 1:
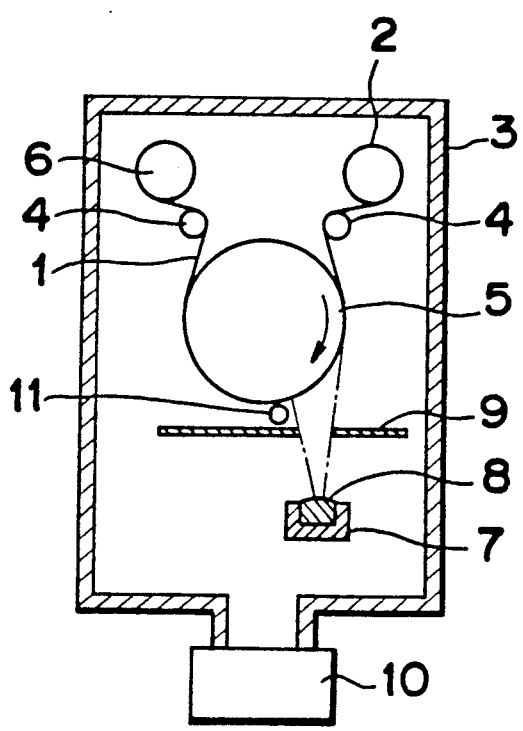
FIG. 1 is a schematic sectional view of an embodiment of a vacuum deposition apparatus.

FIG. 1 is a schematic sectional view of an embodiment of a vacuum deposition apparatus suitable for producing the magnetic recording medium of the invention.

A wound roll 2 of a substrate film 1 made of, for example, a polyethyleneterephthalate film of 12 μm in thickness is installed in a vacuum deposition chamber 3 of the apparatus. The substrate film 1 unwinds from the roll 2, is guided by a guide roll 4, travels around a peripheral surface of a cylindrical can 5 and then is wound by a wind-up roll 6 through another guide roll 4.

Beneath the can 5, an evaporation crucible 7 is placed, which contains a ferromagnetic metal alloy 8 is contained. The metal alloy is, for example, a cobalt-nickel alloy containing 20% by weight of nickel. Between the can 5 and the crucible 7, an incidence angle mask 9 is placed.

Figure 2:
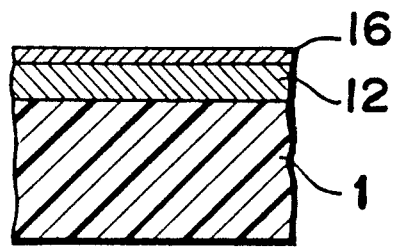
FIG. 2 is an enlarged partial sectional view of the magnetic recording medium.

The chamber 3 is then evacuated by an evacuating means 10 connected with the chamber 3 to $5.0 \times 10^{-6}$ Torr and supplied by oxygen gas from a nozzle 11 to keep the chamber pressure at $8.0 \times 10^{-5}$ Torr. Under such conditions, the ferromagnetic metal alloy 8 is obliquely deposited on the substrate film 1 traveling on the surface of the can 5 to form a ferromagnetic metal layer 12 of 1,500Å in thickness, as shown in FIG. 2. The film, on which the metal layer has been formed, is continuously wound by the wind-up roll 6. The coercive force and squareness ratio of the ferromagnetic layer 12 are 1,000 oersted and 0.7, respectively.

Figure 3:
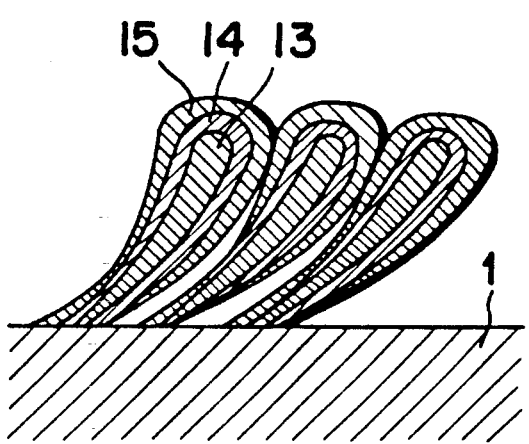
FIGS. 3 and 4 are schematic sectional views of the deposited ferromagnetic metal particles.
Figure 4:
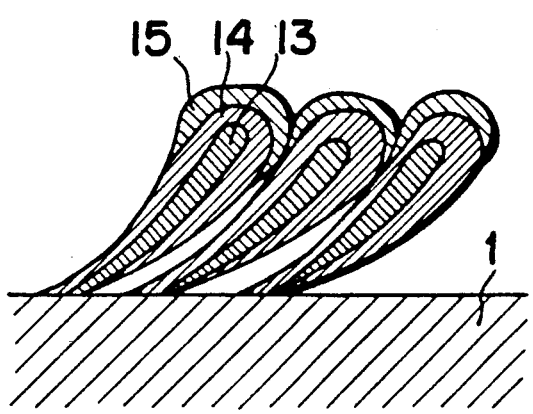

As the ferromagnetic metal 8 is obliquely deposited on the substrate, inclined columnar particles of the metal are formed on the substrate surface 1, as shown in FIGS. 3 and 4. Since the metal is deposited in the presence of oxygen, an oxide layer 14 is formed on at least a part of the surface of each deposited metal particle. The thickness of the oxide layer may vary with the deposition conditions such as the flow rate of oxygen and may be about 300Å or less.

After depositing the ferromagnetic metal on the surface of the substrate film 1, the wound film is removed from the chamber 3 and thermally treated in the presence of at least oxygen and moisture. Thereby, an outer skin layer 15 comprising a hydrated amorphous cobalt (III) oxide is formed on the inner skin oxide layer 14 as shown in FIGS. 3 and 4.

The thermal treatment according to the present invention is carried out at a temperature lower than about 140° C., preferably from about 35° to 100° C., more preferably from about 40° to 90° C. The treatment time varies with the treatment temperature. The higher the temperature, the shorter the treatment time.

Preferably, the relative humidity during the thermal treatment is less than 50%. When the relative humidity is not less than 50%, cobalt (II) hydroxide [Co(OH)$_2$] tends to form rather than hydrated cobalt (III) oxide on the surface of the ferromagnetic metal layer.

Hydrated cobalt (III) oxide may be represented by the formula:

$$Co_2O_3 \cdot nH_2O$$

wherein n is a number of 0.1 to 8, preferably 0.1 to 2.

The state of the formed amorphous oxide area 15 may vary with the heating condition and the like. For example, it may be formed on the whole surface of the columnar particle as shown in FIG. 3, or on a top portion of the columnar particle as shown in FIG. 4. The passivated oxide area 15 may be a layer.

After the thermal treatment, a lubricating layer 6 may be formed on the ferromagnetic layer 12, as shown in FIG. 2. The thickness of the lubricating layer is preferably from 30 to 500Å. When the thickness of the lubricating layer is less than 30Å, its lubricating effect does not last for a long time. When it is larger than 500Å, the recording/reproducing characteristics of the magnetic recording medium are deteriorated due to increase of spacing loss.

The lubricating layer may be formed by applying a solution of a lubricant in a suitable solvent on the ferromagnetic layer having the passivated layer by any of the conventional methods such as spraying, coating and dipping. Examples of the solvent are toluene, methyl isobutyl ketone, methyl ethyl ketone, cyclohexanone, ethyl acetate, isopropanol, fluorohydrocarbon (e.g. Fleon), tetrahydrofuran, dimethylformamide, dioxane and the like. The lubricant as such may be vacuum deposited on the surface of the ferromagnetic layer.

The lubricants include aliphatic lubricants, fluorine-containing lubricants, silicones and hydrocarbons.

Examples of the aliphatic lubricants are aliphatic acids, metal salts or esters of aliphatic acids, aliphatic acid amide, aliphatic alcohol and the like. Specific examples of the aliphatic acid are lauric acid, myristic acid, palmitic acid, oleic acid, stearic acid and docosanoic acid (behenic acid). The acid salts include salts with lithium, sodium, calcium, magnesium, aluminum, iron, cobalt, zinc, barium and lead. The esters include butyl or monoglyceride stearate, octyl myristate, monoglyceride palmitate, monoglyceride oleate and pentaerythritol tetrastearate. The acid amides include caproic amide, capric amide, lauric amide, palmitic amide, stearic amide, docosanoic amide, oleic amide, linolic amide and methylenebisstearic amide. Specific examples of the aliphatic alcohol are stearyl alcohol, myristyl alcohol, and the like. Further, chlorides such as trimethylstearylammonium chloride and stearoyl chloride, and amines such as stearyl amine, stearyl amine acetate and stearyl amine hydrochloride may be used as the lubricant.

Examples of the fluorine-containing lubricants are trichlorofluoroethylene, perfluoropolyether, perfluoroalkyl polyether, perfluoroalkyl carboxylic acid and the like. Examples of the commercially available fluorine-containing compounds are those sold under trade marks such as Daiflon #20 (Daikin Industries), Krytox M (DuPont) and Fonblin (Montedison).

Examples of the silicone type lubricants are silicone oil, modified silicone oil and the like.

Examples of the hydrocarbons are paraffins, squalane, waxes and the like.

The lubricant may be applied without additives on the ferromagnetic layer or may contain at least one additive such as a corrosion inhibitor which improves corrosion resistance of the magnetic recording medium.

Specific examples of the ferromagnetic metal used to make the recording medium of the present invention are metal cobalt and alloys which mainly comprise cobalt such as cobalt-nickel alloy, cobalt-chromium alloy, cobalt-phosphorus alloy, cobalt-iron alloy, cobalt-nickel-phosphorus alloy, cobalt-iron-chromium alloy and cobalt-nickel-chromium alloy. Preferably, the cobalt-nickel alloy or the cobalt-nickel-phosphorus alloy contains nickel in an amount of less than 40% by weight. The cobalt-chromium, cobalt-phosphorus, cobalt-iron, cobalt-iron-chromium and cobalt-nickel-chromium alloys contain cobalt in an amount of not less than 70% by weight.

The ferromagnetic metal may be applied on the substrate by a conventional method such as vacuum deposition, ion plating and sputtering.

Examples of the magnetic recording medium useful in the present invention are a magnetic recording tape which comprises a substrate film made of a film of a synthetic resin (e.g. polyester and polyimide) or a film of a composite material of the synthetic resin and an inorganic material (e.g. carbon fiber and copper) compounded in the resin, a magnetic disc or drum which comprises a substrate disc or drum made of the synthetic resin, the composite material, aluminum and glass, and a magnetic card.

PREFERRED EMBODIMENTS

Practically and presently preferred embodiments of the present invention are shown in following examples.

EXAMPLE 1

By the vacuum deposition method as described above, on the surface of a polyethyleneterephthalate film of 25 cm in width and 1,000 m in length, there were formed columnar particles 13 consisting of 80% by weight of cobalt and 20% by weight of nickel having oxide layers 14. The wound film was removed from the chamber 3 and heated for 3 hours in a heating chamber kept at 60° C., 30RH. The passivated metal layers were formed on both edge portions of the films, each about 2 cm in width. Then the film was cut in the form of plural magnetic recording tapes each having the predetermined width.

EXAMPLE 2

In the same manner as in Example 1 except that the wound film was heated in the heating chamber for 10 hours, magnetic recording tapes were produced.

EXAMPLE 3

In the same manner as in Example 1 except that the wound film was heated in the heating chamber for 24 hours, magnetic recording tapes were produced.

EXAMPLE 4

In the same manner as in Example 1 except that the wound film was heated in the heating chamber kept at 40° C., and 40%RH for 3 hours, magnetic recording tapes were produced.

EXAMPLE 5

In the same manner as in Example 1 except that the wound film in the heating chamber kept at 90° C., 25%RH for 1 hour, magnetic recording tapes were produced.

EXAMPLE 6

In the same manner as in Example 1 except that a lubricating layer of stearic acid was also formed on the surface of the ferromagnetic metal layer, magnetic recording tapes were produced.

EXAMPLE 7

In the same manner as in Example 4 except that a lubricating layer of stearic acid was formed on the surface of the ferromagnetic metal layer, magnetic recording tapes were produced.

EXAMPLE 8

In the same manner as in Example 5 except that a lubricating layer of stearic acid was formed on the surface of the ferromagnetic layer, magnetic recording tapes were produced.

EXAMPLE 9

In the same manner as in Example 1 except that a lubricating layer of perfluoroalkyl polyether (Krytox H manufactured by DuPont) was formed on the ferromagnetic layer surface, magnetic recording tapes were produced.

EXAMPLE 10

In the same manner as in Example 4 except that a lubricating layer of the same perfluoroalkyl polyether as used in Example 9 was formed on the ferromagnetic layer surface, magnetic recording tapes were produced.

EXAMPLE 11

In the same manner as in Example 5 except that a lubricating layer of the same perfluoroalkyl polyether as used in Example 9, magnetic recording tapes were produced.

EXAMPLE 12

In the same manner as in Example 1 except that the wound film was heated in the heating chamber for 100 hours, magnetic recording tapes were produced. The width of the passivated metal layer on each edge portion of the film was about 3 cm.

COMPARATIVE EXAMPLE 1

In the same manner as in Example 1 except that heating the wound film was not treated in the heating chamber, magnetic recording tapes were produced.

COMPARATIVE EXAMPLE 2

In the same manner as in Comparative Example 1 except that a lubricating layer of stearic acid was also formed, magnetic recording tapes were produced.

COMPARATIVE EXAMPLE 3

In the same manner as in Example 1 except that the wound film was heated in the heating chamber and kept at 70° C., 80%RH for 3 hours, magnetic recording tapes were produced.

COMPARATIVE EXAMPLE 4

In the same manner as in Comparative Example 3 except that a lubricating layer of stearic acid was further formed after the heat treatment, magnetic recording tapes were produced.

COMPARATIVE EXAMPLE 5

In the deposition chamber, a metal alloy of cobalt (80% by weight) and nickel (20% by weight) was obliquely deposited on the substrate film to form a ferromagnetic metal layer. Then, heated steam at a temperature higher than 100° C. was blown on to the ferromagnetic layer. In such a manner, steam treated magnetic recording tapes were produced.

Figure 5:
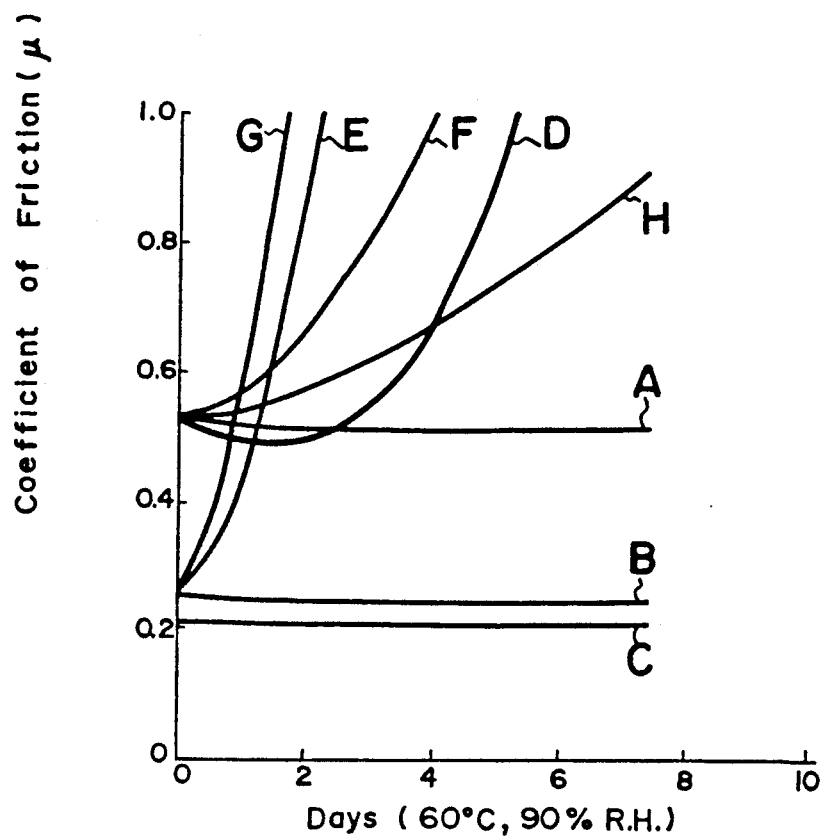
FIG. 5 is a graph showing the change in the coefficient of friction of the magnetic recording tapes produced in Examples 1 to 11 and Comparative Examples 1 to 5.

FIG. 5 shows changes in coefficients of friction of magnetic recording tapes having the passivated metal layer produced in Example 1 to 11 and tapes having no passivated metal layer produced in Comparative Examples 1 to 5.

The coefficient of friction is measured by a friction tester. The coefficient of friction is measured for the magnetic recording tape before and after the tape is kept standing at 60° C., 90%RH for one week.

Line A stands for the results for the magnetic recording tapes of Examples 1 to 5 and 12, Line B stands for those for the magnetic recording tapes of Examples 6 to 8, Line C stands for those of the magnetic recording tapes of examples 9 to 11, Curve D stands for those of the magnetic recording tape of Comparative Example 1, Curve E stands for those of the magnetic tape of Comparative Example 2, Curve F stands for those of the magnetic recording tape of Comparative Example 3, Curve G stands for those of the magnetic recording tape of Comparative Example 4, Curve H stands for those of the magnetic recording tape of Comparative Example 5.

As understood from these results, the coefficients of friction of the magnetic recording tapes of Comparative Examples 1 to 5 considerably increased after keeping the tapes in a high temperature and high humidity atmosphere for a long time. On the contrary, the magnetic recording tapes of the present invention show no change after standing in the coefficients of friction, which means that the lubricating characteristics of the tape are excellent.

Figure 6:
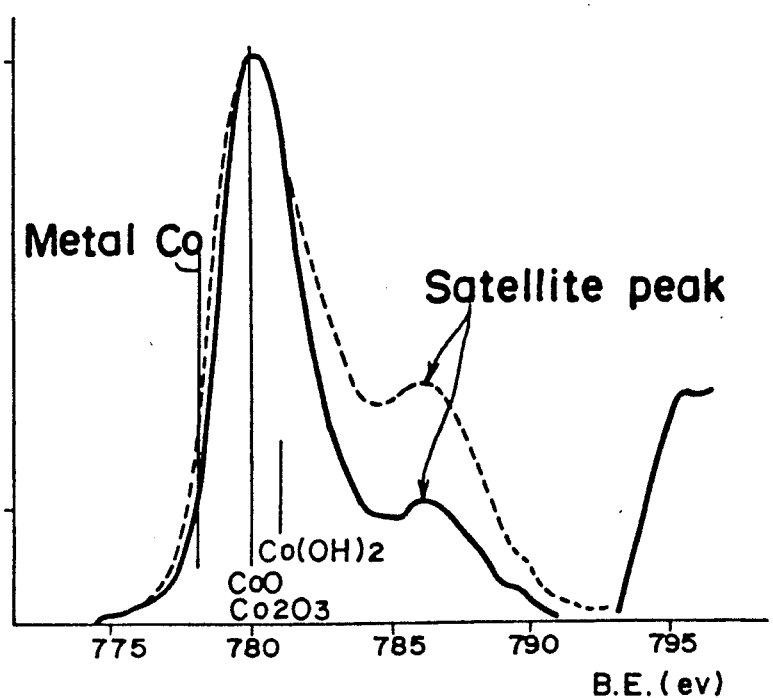
FIGS. 6 to 8 show the spectra of $Co_{2p3/2}$ of the magnetic recording tape of the present invention.
Figure 7:
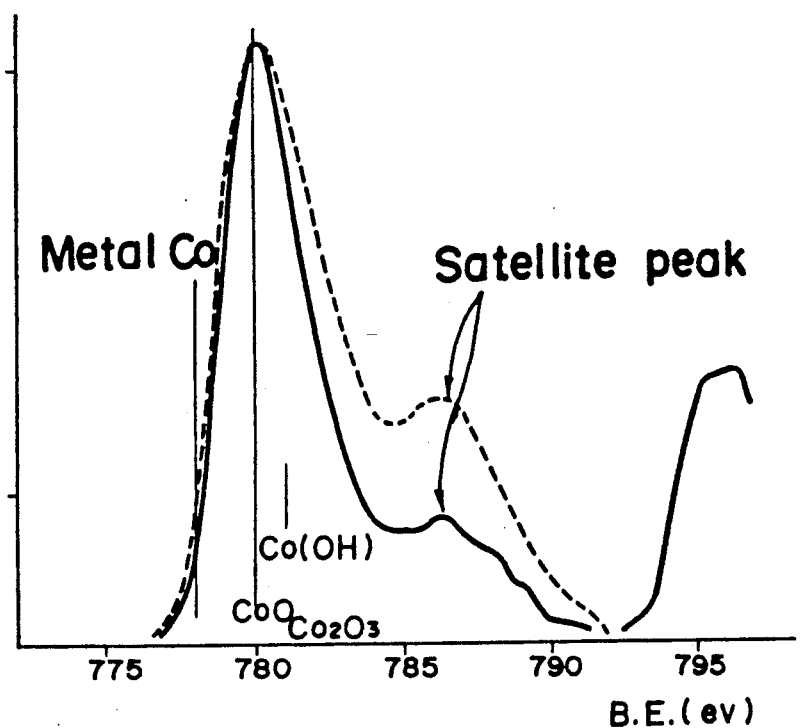
Figure 8:
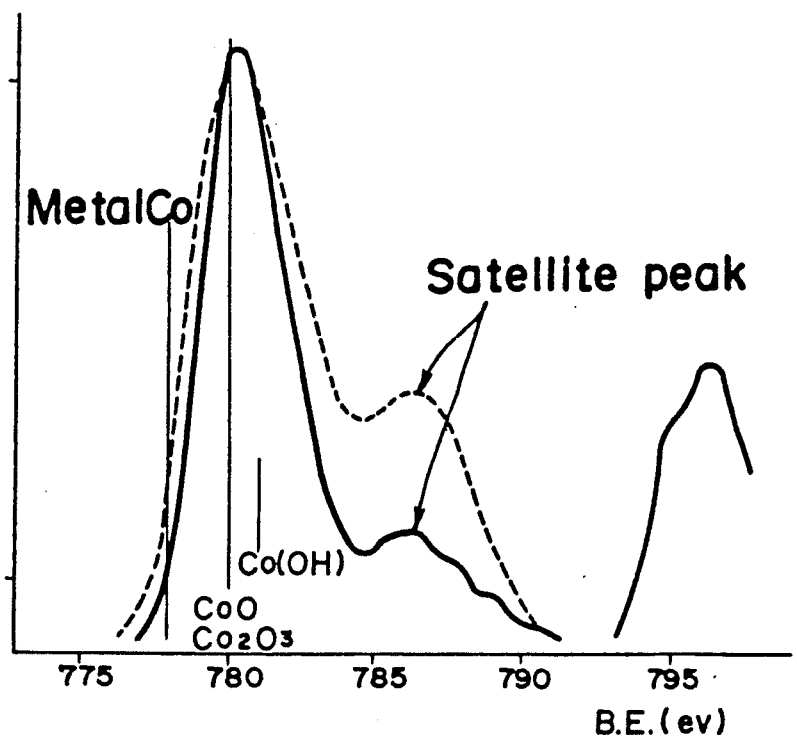

XPS analysis of the components of the ferromagnetic metal layer was carried out for the magnetic recording tape produced in Example 6 near the interface between the passivated layer and the lubricating layer and at a depth of 50Å from said interface by means of an ESCALAB 5 analyzer (trade name of VG Scientific Limited) under the following conditions:

X-ray output: 10 kV, 20 mA
Excape Angle: 0 (zero)
Binding energies relative to $C_{1s}$: 284.6 eV FIGS. 6, 7 and 8 show the spectra of $Co_{2p3/2}$ obtained by the XPS analysis of the magnetic recording tape just after the tape production (Sample No. I), after the tape is kept standing at 60° C., 90%RH for 4 days (Sample no. II) and after the tape is kept at 60° C., 90%RH for 15 days (Sample No. III), respectively. In these figures, the solid lines represent the results near the interface between the ferromagnetic layer and the lubricating layer, and the dotted lines represent the results at the depth of 50Å from the interface.

Figure 9:
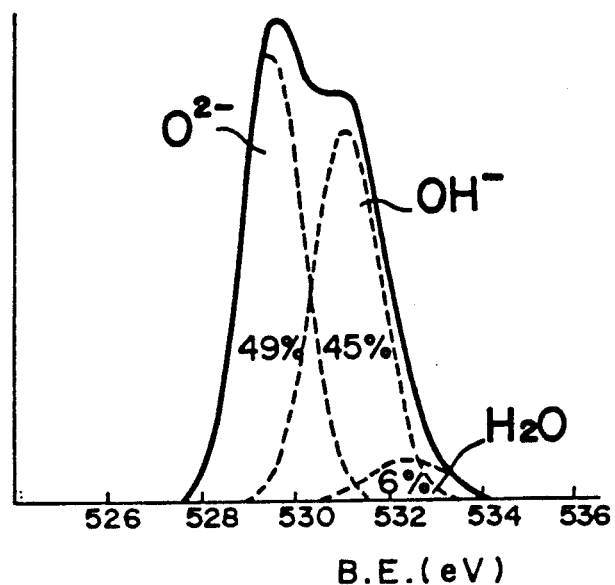
FIGS. 9 and 10 show the spectra of $O_{1s}$ of the magnetic recording tape of the present invention.
Figure 10:
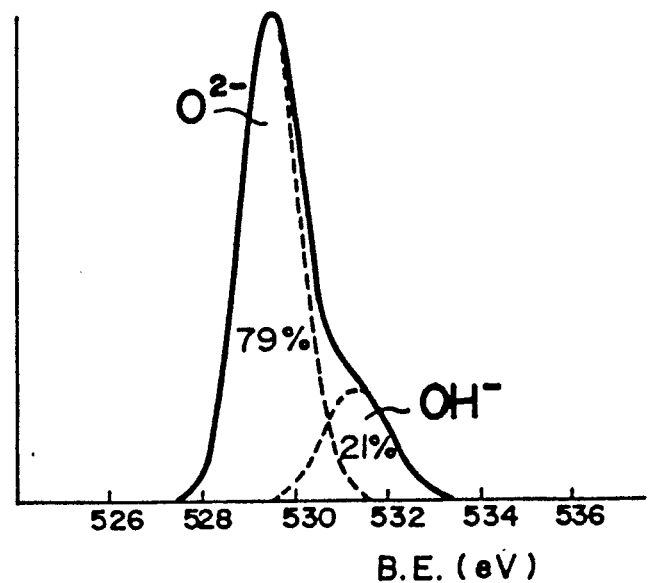

FIGS. 9 and 10 show the $O_{1s}$ spectra of the freshly produced magnetic recording tape (Sample No. I), in which the solid lines represent the observed spectra. Among them, FIG. 9 is the spectrum for the component near the interface between the ferromagnetic layer and the lubricating layer, and FIG. 10 is the spectrum for the component at a depth of 50Å from the interface. Since each of the observed spectra was a composite spectrum, it was separated into component spectra which are shown by the dotted lines in FIGS. 9 and 10. The analysis of these separated spectra revealed that the composite spectra included a peak at 529.7 eV corresponding to $O^{2-}$ due to the oxide, one at 531.1 eV corresponding $OH^-$ due to the hydrated oxide and one at 532.4 eV corresponding to water or the organic compounds.

The spectra for Sample Nos. III and IV were substantially the same as those in FIGS. 9 and 10.

Analysis results on the spectra of FIGS. 6 to 10 will be described both for the interfacial part and the inner part (at 50Å depth from the interface) of the ferromagnetic metal layer.

From the $Co_{2p3/2}$ spectra of FIGS. 6 to 8, in the interfacial part between the ferromagnetic layer and the lubricating layer, a strong peak is observed corresponding to the cobalt oxide or the hydrated cobalt oxide at 780.0 eV in each of the Sample Nos. I, II and III, and no peak corresponding to $Co(OH)_2$ at 781.0 eV, which hydroxide may cause the change on standing of the coefficient of friction. In addition, the spectrum for the component of the interfacial part has a very low satellite peak at 785.9 eV which indicates the presence of $Co^{2+}$ ion and is very high in the spectrum for the component of the inner part. This means that the interfacial part of the ferromagnetic layer contains a cobalt (III) oxide or hydrated cobalt (III) oxide and the inner part of the ferromagnetic layer contains cobalt (II) oxide.

From the $O_{1s}$ spectrum of FIG. 9, in the interfacial part of the ferromagnetic layer, clearly observed is the peak at 529.7 eV corresponding to $O^{2-}$ and that at 531.1 eV corresponding to $OH^-$. In view of the results of the $Co_{2p3/2}$ spectra as above, these peaks indicate that the hydrated cobalt (III) oxide is predominantly contained in the interfacial part.

From the $O_{1s}$ spectrum of FIG. 10, in the part deep from the interface, the height of the peak corresponding to $OH^-$ is greatly lowered and the peak corresponding to $O^{2-}$ is predominant. These results as well as the above results for the $Co_{2p3/2}$ indicate that the inner part of the ferromagnetic metal layer predominantly contains cobalt (II) oxide.

An inner part deeper than 50Å of the ferromagnetic layer gives a spectrum mainly consisting of a peak at 778.0 eV corresponding to metal cobalt.

From these results, it may be concluded that the ferromagnetic metal layer comprises another skin layer mainly consisting of $Co_2O_3 \cdot nH_2O$, an inner skin layer mainly consisting of CoO beneath the surface skin layer, and a layer mainly consisting of metal cobalt beneath the inner skin layer.

The interface between the ferromagnetic layer and the lubricating layer was observed by means of a reflection electron diffraction (Electron microscope H-700H manufactured by Hitachi). Acceleration voltage, 75 kV). A diffraction pattern corresponding to CoO was observed but that corresponding to the hydrated cobalt (III) oxide ($Co_2O_3 \cdot nH_2O$) was not observed. These results may suggest that hydrated cobalt (III) oxide formed on the columnar shape particle could be amorphous.

Each of the magnetic recording tapes produced in Examples 1 to 12 and Comparative Examples 1 to 5 was measured for the percentage of the passivated cobalt hydroxide layer [(Passivated surface area/surface area of the whole ferromagnetic metal layer) × 100]. Further, by XPS analysis, a H2/H1 ratio and a H4/H3 ratio of each magnetic recording tape was calculated. These results as well as corrosion resistance are shown in Table 1.

Corrosion resistance of the magnetic recording tape is measured as follows:

A magnetic recording tape is kept standing in an atmosphere of 90%RH at 60° C. for 5 weeks and saturation magnetization of the tape before and after it was kept standing was measured. Corrosion resistance is evaluated by the rate of the deterioration of saturation magnetization.

In the columns of the ratios of H2/H1 and H4/H3 and Corrosion resistance of Table 1, "A part" and "B part" stand for a part where the passivated cobalt hydroxide was formed and a part where the passivated cobalt hydroxide was not formed, respectively.

TABLE 1

| Sample No. | Yield of passivated area (%) | Ratio of H2/H1 A part | Ratio of H2/H1 B part | Ratio of H4/H3 A part | Ratio of H4/H3 B part | Corrosion resistance (%) A part | Corrosion resistance (%) B part |
|---|---|---|---|---|---|---|---|
| Example 1 | 16 | 0.35 | 0.52 | 0.93 | 1.15 | 5.3 | 20.3 |
| Example 2 | 18 | 0.32 | 0.48 | 0.80 | 1.10 | 5.0 | 19.6 |
| Example 3 | 19 | 0.23 | 0.48 | 0.80 | 1.02 | 5.0 | 18.8 |
| Example 4 | 15 | 0.28 | 0.47 | 1.03 | 1.17 | 6.1 | 20.6 |
| Example 5 | 15 | 0.24 | 0.44 | 0.58 | 0.98 | 4.7 | 17.4 |
| Example 6 | 16 | 0.36 | 0.52 | 1.01 | 1.18 | 5.4 | 24.1 |
| Example 7 | 15 | 0.29 | 0.49 | 1.10 | 1.21 | 6.2 | 25.7 |
| Example 8 | 15 | 0.24 | 0.45 | 0.72 | 1.16 | 4.9 | 22.8 |
| Example 9 | 16 | 0.35 | 0.53 | 1.00 | 1.20 | 5.3 | 20.7 |
| Example 10 | 15 | 0.27 | 0.47 | 1.10 | 1.21 | 6.1 | 21.0 |
| Example 11 | 15 | 0.23 | 0.43 | 0.69 | 1.15 | 4.7 | 18.1 |
| Example 12 | 24 | 0.20 | 0.45 | 0.74 | 1.01 | 4.5 | 17.1 |
| Comp. Ex. 1 | 0 | 0.54 | | 1.16 | | 22.8 | |
| Comp. Ex. 2 | 0 | 0.54 | | 1.20 | | 26.1 | |
| Comp. Ex. 3 | 0 | 0.45 | | 2.42 | | 20.4 | |
| Comp. Ex. 4 | 0 | 0.45 | | 2.63 | | 23.2 | |
| Comp. Ex. 5 | 0 | 0.43 | | 4.30 | | 19.6 | |

As understood from the above results, in contrast of the B part, the A part where the passivated cobalt oxide layer is formed has the ratio of H2/H1 of less than 0.40 and the ratio of H4/H3 of between 0.50 and 1.10, and good corrosion resistance.

EXAMPLE 13

Figure 11:
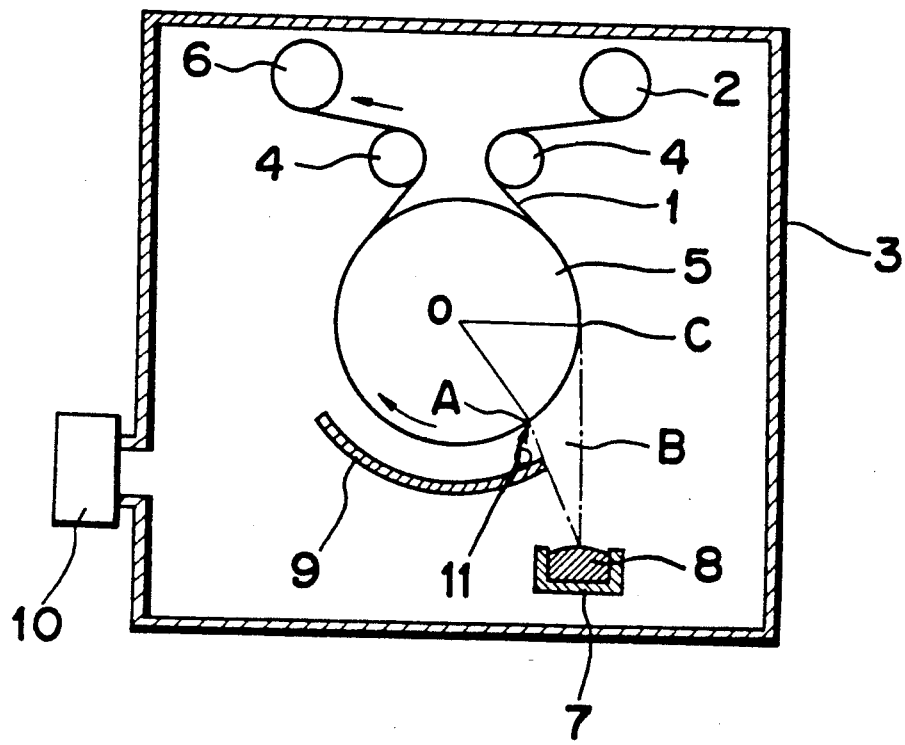
FIGS. 11 and 12 are schematic sectional views of another embodiment of a vacuum deposition apparatus.
Figure 12:
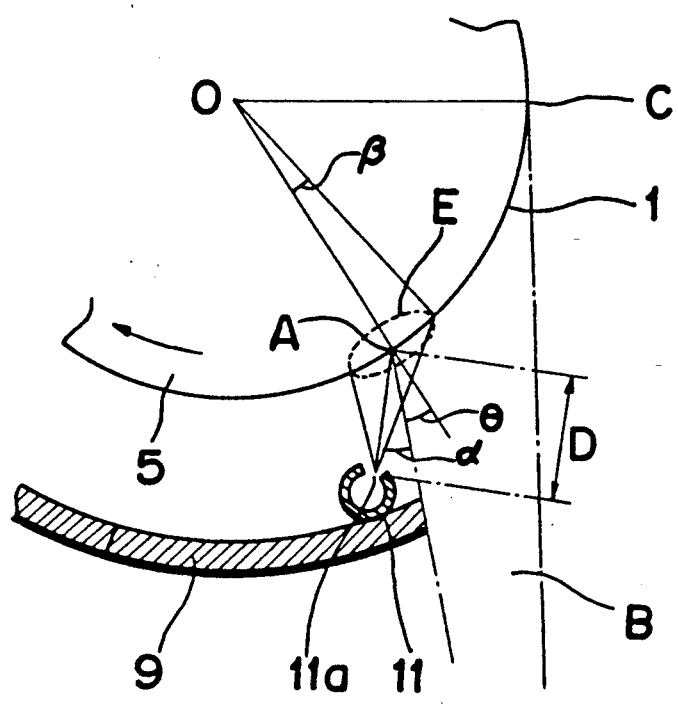

On a polyethyleneterephthalate film of 12 μm in thickness, 50 cm in width and about 5,000 m in length, a ferromagnetic metal alloy layer comprising 80% by weight of cobalt and 20% by weight of nickel was deposited by means of the vacuum deposition apparatus as shown in FIGS. 11 and 12, in which the same numerals stand for the same elements as those in FIG. 1.

Generally, on the substrate film traveling around the peripheral surface of the can 5 from the maximum incidence angle region to the minimum incidence angle region, the vaporized ferromagnetic metal is vacuum deposited with an oxidizing gas jet stream (e.g. oxygen or a gaseous mixture of oxygen and a diluent gas such as nitrogen, helium, argon and the like) at least near the minimum incidence angle region so that the oxidizing gas is directly deposited by the jet on the substrate. Preferably, an angle between the stream of the oxidizing gas and the stream of the vaporized metal impinged at the minimum incidence angle is not greater than 30°, and the central angle about the longitudinal axis of the cylindrical can of the directly jetted arc area of the substrate starting from the minimum incidence angle point toward a point at which the incidence angle is larger is not greater than about 10°.

With reference to FIGS. 11 and 12, a gas inlet nozzle 11 for jet-spraying the oxidizing gas is placed between the can 5 and the mask plate 9 and near one edge of the plate 9. The position of the nozzle 11 is so selected that the distance D from the supply opening 11a to the position A is not greater than 15 cm and the angle α between the stream of the oxidizing gas and the stream B of the vaporized metal impinged by the minimum incidence angle θ is not greater than about 30°. Further, the central β about the longitudinal axis 0 of the cylindrical can 5 of the directly jetted arc area E of the substrate starting from the minimum incidence angle point A toward a point at which the incidence angle is larger is not greater than about 10°.

When the oxidizing gas is jet-sprayed under such conditions directly on the substrate 1 at least near the minimum incidence angle point A, the concentration of the oxidizing gas is maximum near the point A. In addition, oxygen filled in the chamber tends to be trapped in the ferromagnetic metal thin layer in a relatively high concentration near the maximum incidence angle point C since the deposition rate of the ferromagnetic metal is lower near the point C. As the result, when the nuclei of the particles of the ferromagnetic metal are formed on the substrate near the point C, particles having a sufficiently small size and containing comparatively large amount of oxygen atom are formed.

The incidence angle θ of the ferromagnetic metal is preferably not larger than 65° since at the incidence angle larger than 65°, the deposition efficiency of the ferromagnetic metal is decreased.

By these measures, oxygen atoms are surely introduced in the surface portion of the columnar particles of the ferromagnetic metal which is being obliquely deposited on the substrate. Thereby, the average content of oxygen is controlled in an amount of from 20 to 50 atomic percent in the inner skin layer of the ferromagnetic layer with a depth of 100 Å from the surface. When the passive metal layer is formed on the skin layer of the ferromagnetic metal containing oxygen atoms in the above amount, corrosion resistance and durability of the magnetic recording media are further improved.

The chamber 3 was evacuated to $5.0 \times 10^{-6}$ Torr by the evacuating means 10 connected with the chamber 3. Oxygen gas was jetted from the nozzle 11 at a rate of 2.0 l/min. The substrate was drawn around the can 5 at a rate of 160 cm/min., on which the nickel-cobalt alloy was obliquely impinged and deposited to form a ferromagnetic metal layer 12 of 1,500Å in thickness. The substrate having the ferromagnetic metal layer was continuously wound by the wind-up roll 6. The measurement of the magnetic characteristics of the ferromagnetic layer 12 revealed that coercive force was 1,000 oersted and the squareness was 0.7. By Auger electron spectroscopic analysis, it was found that the average oxygen content in the inner skin layer of the depth of 100Å from the surface of the ferromagnetic layer was about 32 atomic percent.

Figure 13:
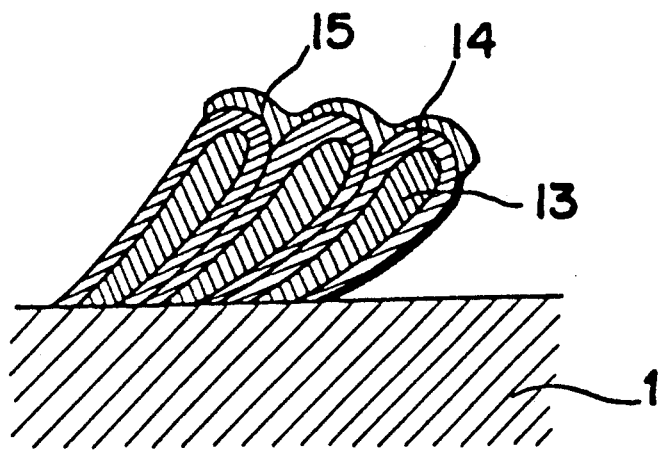
FIG. 13 is a schematic sectional view of the deposited ferromagnetic metal particles.

By obliquely impinging the ferromagnetic metal, the inclined columnar particles 13 are formed as shown in FIG. 13. Around each particle 13, a layer 14 of cobalt oxide is formed since the particle is deposited in an atmosphere containing oxygen. The content of oxygen in the inner skin layer can be adjusted by the flow rate of oxygen from the nozzle 11. In FIG. 13, a layer 15 is a passivated cobalt oxide layer formed in the subsequent oxidation.

After the deposition process of the ferromagnetic metal, the pressure of the chamber was raised over about 30 minutes to atmospheric pressure at 25° C., 40%RH, and the finished roll having the ferromagnetic metal layer was kept standing for 3 hours under the same conditions. Thereafter, the finished roll was contained in a sealed can and evacuated to about 10 Torr. Then, the can was pressurized by oxygen to 1.3 atm., and kept standing under the same pressure at 25° C. for about 70 hours to passivate the ferromagnetic metal layer. The passivated cobalt oxide layer was formed on the whole surface of the ferromagnetic metal layer deposited on the substrate. The thus treated finished roll was cut to form a magnetic recording tape with a predetermined width.

The surface of the ferromagnetic metal layer of the produced magnetic recording tape was analyzed by XPS analysis by means of ESCALAB 5 under the same conditions as described in the above.

Figure 14:
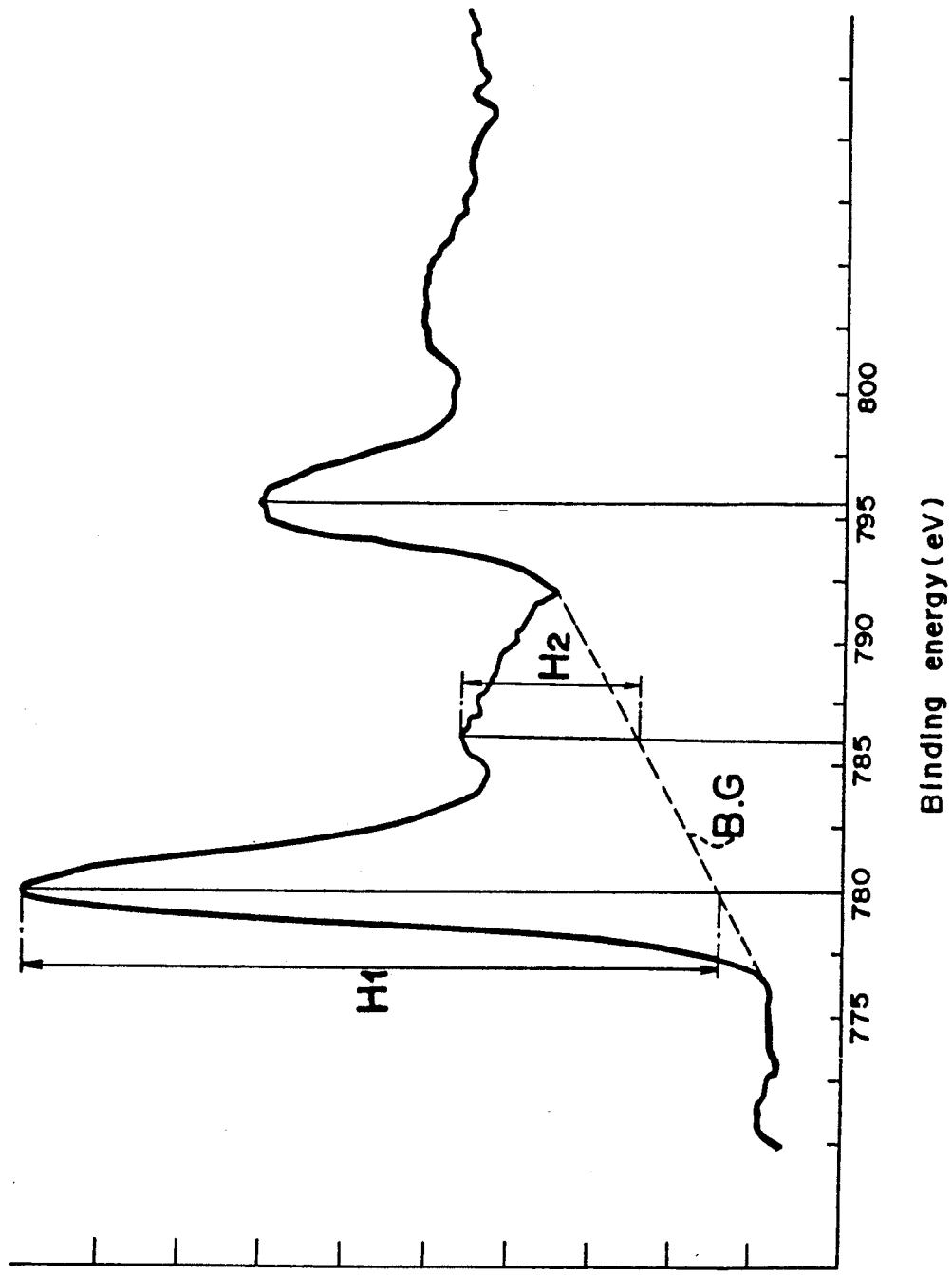
FIGS. 14 and 15 are $Co_{2p3/2}$ spectrum and $O_{1s}$ spectrum, respectively.
Figure 15:
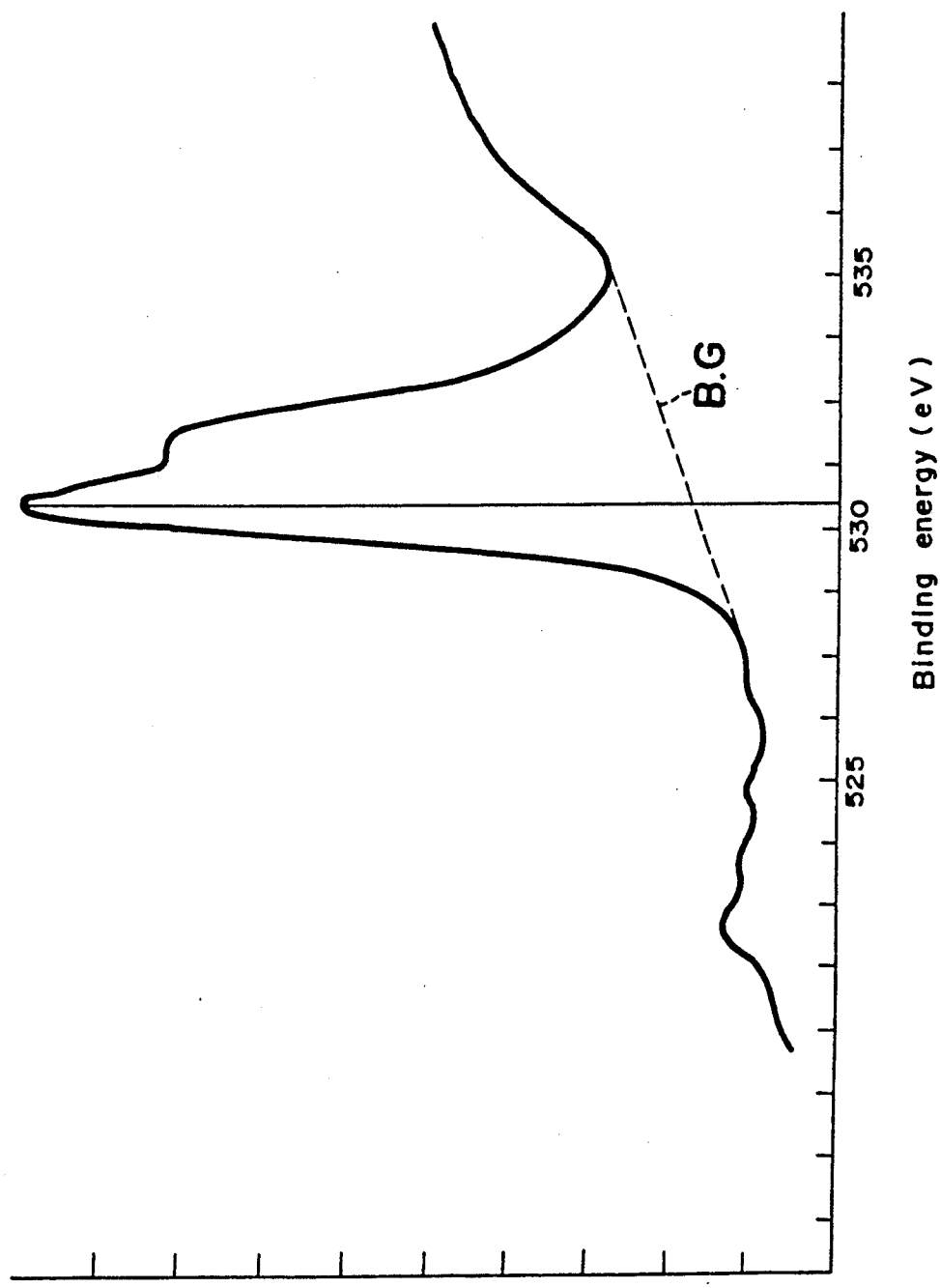
Figure 16:
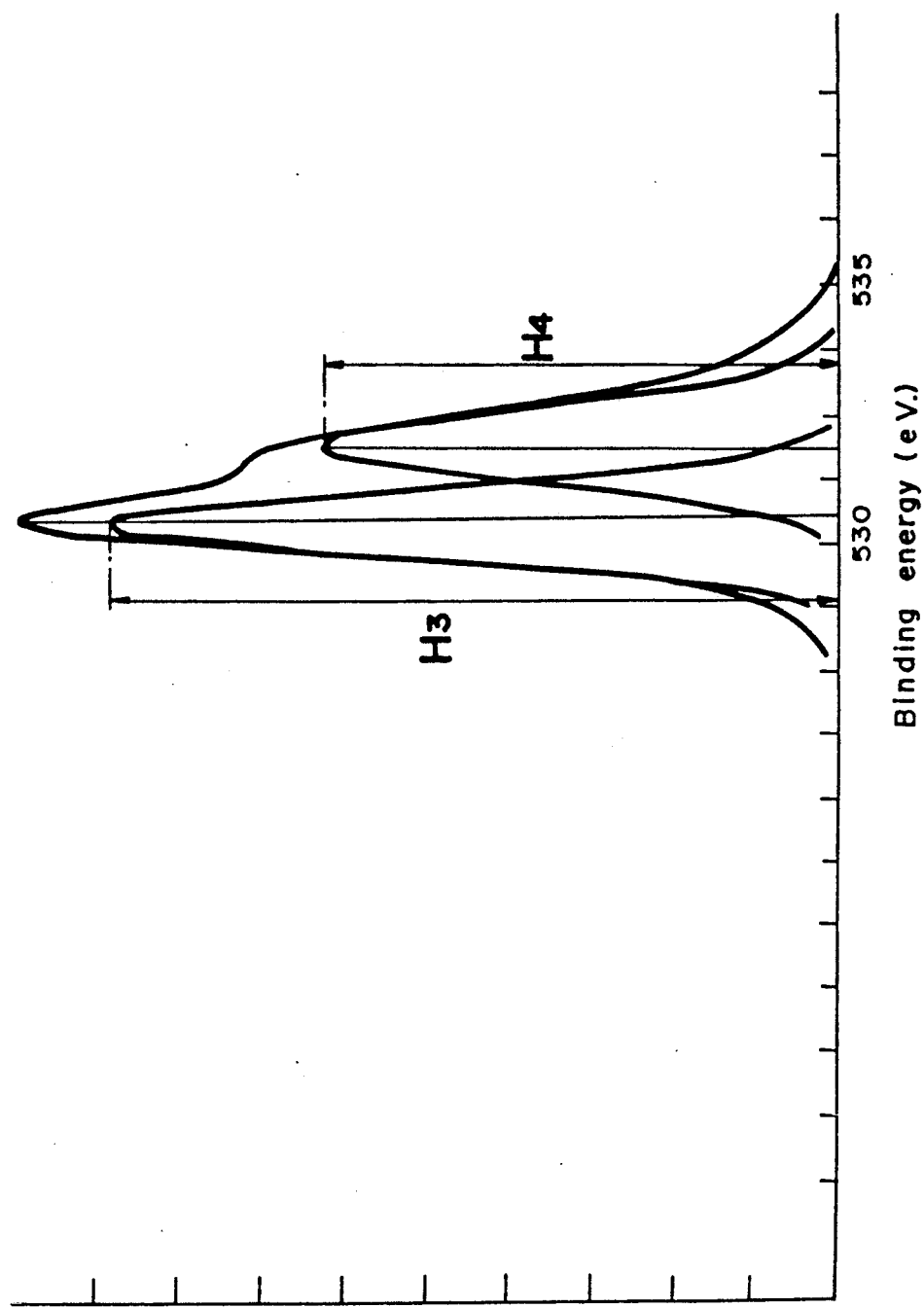
FIG. 16 is a modified spectrum of FIG. 15.

FIGS. 14 and 15 are $Co_{2p3/2}$ spectrum and $O_{1s}$ spectrum, respectively obtained by the XPS analysis, and FIG. 16 is a background-subtracted spectrum of FIG. 15, which was obtained by subtracting the background from the spectrum of FIG. 5 and separating the component peaks.

As is seen from these spectra, in case of the magnetic recording medium produced in Example 13, when the background (BG) line is drawn between the lower energy side leading edge points of peaks at 780.0±0.3 eV (2p3/2) and 795.6±0.3 eV (2p1/2) in the $Co_{2p}$ spectrum (of. FIG. 14), a ratio of a satellite peak height H2 at 785.9±0.3 eV to the main peak height H1 at 780.0±0.3 eV is 24:100.

In the $O_{1s}$ spectrum of FIG. 16, a ratio of a peak height H4 at a higher binding energy site to a peak height H3 at a lower binding energy site is 72:100 when a background line is drawn between the lower energy side leading edge point and the higher energy side leading edge point of a complex peak shown in FIG. 15 from which the two peaks at the higher and the lower energy sites are derived by computer peak synthesis.

When the ratio of H2:H1 is larger than 40:100, the corrosion resistance of the magnetic recording medium is not satisfactory, and lubricating performances at high temperature and high humidity tends to be deteriorated on standing. Therefore, the ratio of the satellite peak height H2 at 785.9±0.3 eV to the main peak height H1 at 780.0±0.3 eV is preferably 40:100 or less.

In the $O_{1s}$ spectrum, when the ratio of the height H4 of the peak at the higher binding energy site (assigned to oxygen of the hydroxyl group) to the height H3 of the peak at the lower binding energy site (assigned to oxygen of the metal oxide) is larger than 110:100, durability of lubricating characteristics is not good even if the ratio of the peaks of the $Co_{2p3/2}$ spectrum is in the above range. A reason for this has not been clarified and may be that cobalt could be present in a state similar to the viscous hydroxide.

The passivated layer is formed by a dehydration reaction process, as described below. Therefore, it may take a longer time to form the passivated cobalt oxide with the ratio of H4:H3 smaller than 50:100

Although only the spectra of the magnetic recording medium produced in Example 13 are shown in FIGS. 14 to 16, it has been confirmed that other magnetic recording media produced in other examples had the ratio of H2:H1 of 40:100 or less and the ratio of H4:H3 between 110:100 and 50:100 by the same analysis.

It can be concluded that the presence of the hydroxyl group in the passivated outer skin layer of the ferromagnetic metal layer is essential to improve its corrosion resistance. The reason for this may be that the passivated outer skin layer has a network structure of the amorphous compound including the hydroxyl groups so that corrosion reaction is prevented.

For the formation of the passivated cobalt layer, the ferromagnetic metal layer is treated by (1) application of moisture (hydration) and (2) oxidation with dehydration. These two treatments may be carried out separately or simultaneously. When the two treatments are simultaneously carried out, it is required to heat the substrate having the ferromagnetic metal layer at a temperature higher than 40° C. and relative humidity lower than 50% as shown in Examples 1 to 12 since the two treatments conflict with each other. Therefore, the rate of passivation reaction is very low.

On the contrary, when the two treatments are separately carried out as in Example 13, the rate of passivation reaction is very large, and the whole surface of the magnetic metal layer can be easily and homogeneously passivated. In this case, moisture absorption is carried out by exposing the substrate with the ferromagnetic metal layer to an atmosphere containing water vapor under partial pressure of $10^{-3}$ Torr or higher. Even if the substrate is exposed to an atmosphere saturated with vapor, the object of the present invention can be achieved by controlling the amount of water to be removed in the subsequent evacuating step. In view of productivity and processability, the substrate is usually moistened by keeping it at a room temperature and relative humidity of 30% to 80% for 0.1 to 24 hours, preferably 0.1 to 6 hours.

In the oxidation-dehydration process, water should be removed from the reaction system so as to proceed dehydration of the ferromagnetic metal. For this end, the oxidation should be carried out in a dry atmosphere. Dry oxidation can be carried out with pure oxygen or dry oxygen-containing gas in the presence of a drying agent.

As shown in Example 13, preferably the substrate with the ferromagnetic metal layer is contained in the sealed can and evacuated to a pressure of 100 Torr or lower, preferably 50 Torr or lower followed by oxidation in an atmosphere containing oxygen gas under pressure of higher than 100 Torr, preferably from 100 Torr. to 5 atm. The atmosphere for oxidation may comprise pure oxygen or a mixture of oxygen and an inert gas.

Although the passivated cobalt oxide layer may be formed directly on the pure ferromagnetic metal layer, it is preferably formed on the ferromagnetic metal layer through the layer of cobalt oxide since thereby wear resistance is fairly improved. In addition, when the skin layer I with a thickness of not larger than 100Å from the surface of the ferromagnetic layer contains oxygen in an amount of 20 atomic percent or more on the average, wear resistance of the ferromagnetic metal layer is considerably improved. However, when the average oxygen content in the inner skin layer exceeds 50 atomic percent, wear resistance tends to be deteriorated. Thus, preferred average oxygen content in the skin layer is from 20 to 50 atomic percent.

EXAMPLE 14

In the same manner as in Example 13 except that, after deposition of the cobalt alloy, the pressure of the chamber was raised over about 30 minutes to atmospheric pressure at 25° C., 40%RH and immediately the finished roll was contained in the sealed can, the magnetic recording tapes were produced.

EXAMPLE 15

In the same manner as in Example 13 except that the finished roll in the sealed can at a room temperature under reduced pressure of 0.6 atm. for about 140 hours (Sample No. 15-1), or under pressure of 1 atm. for about 100 hours (Sample No. 15-2), the magnetic recording tapes were produced.

EXAMPLE 16

In the same manner as in Example 13 except that the flow rate of oxygen was so controlled that the average oxygen content in the skin layer with a thickness of 100Å from the surface was 2 atomic percent (Sample No. 16-1), 10 atomic percent (Sample No. 16-2), 20 atomic percent (Sample No. 16-3), 45 atomic percent (Sample no. 16-4) and 52 atomic percent (Sample No. 16-5), magnetic recording tapes were produced.

EXAMPLE 17

In the same manner as in Example 13 except that, after the deposition of the ferromagnetic metal, the reduced pressure of the chamber was raised over about 30 minutes to atmospheric pressure at 25° C., 60%RH and then the substrate was oxidized in the sealed can for 50 hours, magnetic recording tapes were produced.

Each of the magnetic recording tapes produced in Examples 13 to 17 was measured with respect to the percentage of the passivated cobalt hydroxide layer in the same manner as above. Further, by XPS analysis, a H2/H1 ratio and a H4/H3 ratio of each magnetic recording tape was calculated. These results as well as corrosion resistance are shown in Table 2.

COMPARATIVE EXAMPLE 6

For comparison, a magnetic recording tape was produced in the same manner as in Example 13 except that, after the deposition of the ferromagnetic metal, the pressure of the chamber was raised to atmospheric pressure with oxygen gas (water vapor pressure of $10^{-4}$ Torr.) and the finished roll was kept under these conditions for about 100 hours. The results are also shown in Table 2.

TABLE 2

| Sample No. | Yield of passivated area (%) | Ratio of H2/H1 | Ratio of H4/H3 | Corrosion resistance (%) |
|---|---|---|---|---|
| Example 13 | 100 | 0.24 | 0.72 | 5.6 |
| Example 14 | 100 | 0.29 | 0.61 | 5.9 |
| Example 15-1 | 100 | 0.34 | 0.54 | 7.1 |
| Example 15-2 | 100 | 0.30 | 0.59 | 6.6 |
| Example 16-1 | 100 | 0.35 | 0.82 | 4.2 |
| Example 16-2 | 100 | 0.30 | 0.85 | 4.9 |
| Example 16-3 | 100 | 0.32 | 0.74 | 5.5 |
| Example 16-4 | 100 | 0.35 | 0.91 | 6.2 |
| Example 16-5 | 100 | 0.25 | 0.63 | 8.5 |
| Example 17 | 100 | 0.17 | 1.05 | 4.2 |
| Comp. Ex. 6 | 1 | 0.50 | 1.13 | 19.5 |

As understood from the above results, the magnetic recording tapes of the present invention have the ratio of H2/H1 less than 0.40 and the ratio of H4/H3 between 0.50 and 1.10 so that they have better corrosion resistance and a greater yield of the passivated area than the tape of Comparative Example 6 which has a ratio of H2/H1 of 0.50 and a ratio of H4/H3 of 1.13.

The surface of each of the magnetic recording tapes produced in Examples was analyzed by means of a reflection electron diffraction (Electron microscope Type H-700H manufactured by Hitachi. Accelerating voltage: 75 kV. A diffration pattern due to cobalt oxide was obtained but any pattern due to hydrated cobalt (III) oxide was not obtained. These results suggest that the passivated cobalt hydroxide is amorphous.

EXAMPLE 18

On the surface of the ferromagnetic metal thin layer of each of the magnetic recording tapes produced in Examples 13–17 and Comparative Example 6, a 0.1% by weight solution of an ester of a fluorine-containing oil [$HOCH_2CF_2\text{-}O(C_2F_4O)_m(CF_2O)_nCF_2CH_2OH$] in 1,1,2-trichloro-1,2,2-trifluoroethane was coated and dried to form a lubricating layer of 150Å in thickness (Sample Nos. 13a, 14a, 15-1a, 15-2a, 16-1a, 16-2a, 16-3a, 16-4a, 16-5a, 17a, and Comparative 6a).

EXAMPLE 19

On the surface of the ferromagnetic metal thin layer of each of the magnetic recording tapes produced in Examples 13–17 and Comparative Example 6, a 0.1% by weight solution of stearic acid in methyl isobutyl ketone was coated and dried to form a lubricating layer of 150Å in thickness (Sample Nos. 13b, 14b, 15-1b, 15-2b, 16-1b, 16-2b, 16-3b, 16-4b, 16-5b, 17b and Comparative 6b).

Coefficients of friction of the magnetic recording tapes produced in Examples 18 and 19 were measured, which were kept standing in an atmosphere of relative humidity of 90% at 60° C. for 5 weeks.

Figure 17:
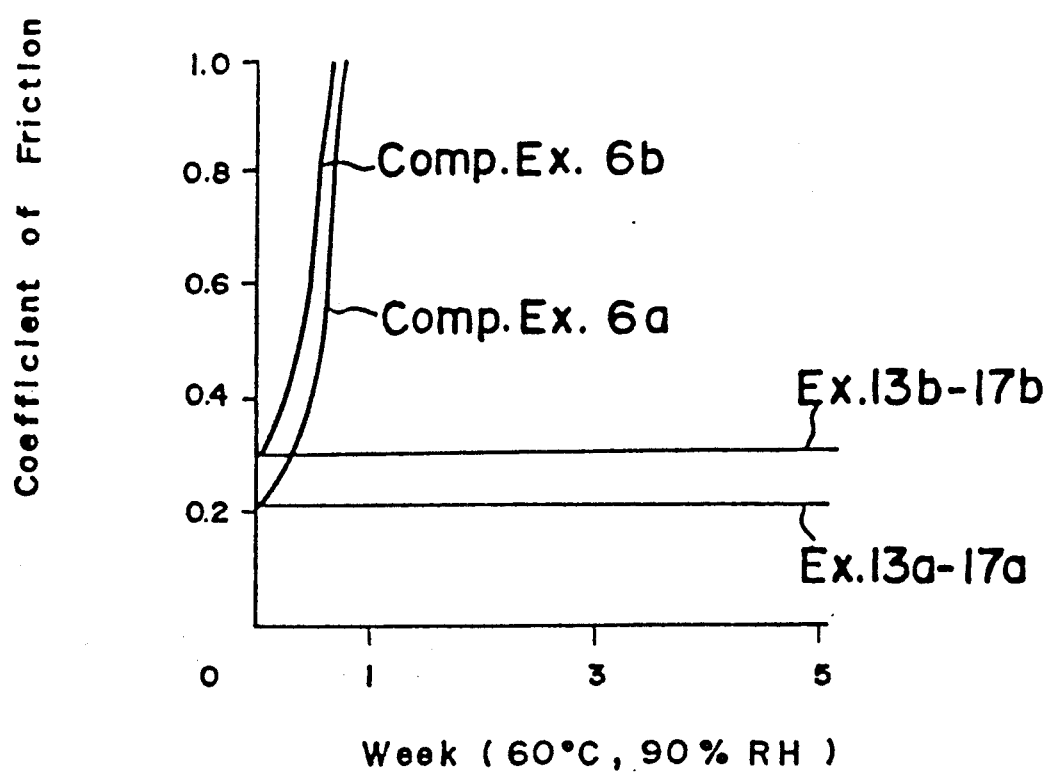
FIG. 17 is a graph showing the change in the coefficient of friction of the magnetic recording tapes produced in Examples 13 to 17 and Comparative Example 6.

FIG. 17 shows the change after a period of standing of the coefficient of friction.

As is apparent from the results of FIG. 17, the coefficient of friction of the magnetic recording tape of Comparative Example 6 greatly increased even over time when the lubricating layer was formed (Sample Nos. 6a and 6b) while the magnetic recording tape of the present invention showed no substantial change in the coefficient of friction.

From the substrate having the ferromagnetic metal layer produced in Examples 18 and 19, a ½ inch VHS video tape was produced and its still life time was measured before and after keeping the tape in an atmosphere of relative humidity of 90% at 60° C. for one week. The results are shown in Table 3.

TABLE 3

| Sample No. | Still life time (min) Before | After |
|---|---|---|
| 13a | >60 | >60 |
| 14a | >60 | >60 |
| 15-1a | >60 | >60 |
| 15-2a | >60 | >60 |
| 16-1a | 2.0 | 2.1 |
| 16-2a | 7.7 | 8.0 |
| 16-3a | >60 | >60 |
| 16-4a | >60 | >60 |
| 16-5a | 9.7 | 9.7 |
| 17a | >60 | >60 |
| Comp. 6a | >60 | 9.2 |
| 13b | >60 | >60 |

TABLE 3-continued

| Sample No. | Still life time (min) | |
| --- | --- | --- |
| | Before | After |
| 14b | >60 | >60 |
| 15-1b | >60 | >60 |
| 15-2b | >60 | >60 |
| 16-1b | 1.8 | 1.7 |
| 16-2b | 7.4 | 7.2 |
| 16-3b | >60 | >60 |
| 16-4b | >60 | >60 |
| 16-5b | 9.3 | 9.0 |
| 17b | >60 | >60 |
| Comp. 6b | >60 | 8.3 |

From these results, in comparison with the tapes of Comparative Examples in which the passivated layer was not formed, the video tapes of this invention did not show any substantial change on standing of still life time, which means no change on standing of wear resistance. Particularly, when the skin layer I of the ferromagnetic metal layer contains oxygen in an amount of 20 to 50 atomic percents on average, the magnetic recording medium has superior wear resistance (cf. Samples Nos. 13a, 13b, 14a, 14b, 15-1a, 15-1b, 15-2a, 15-2b, 16-3a, 16-3b, 16-4a, 16-4b, 17a and 17b).

What is claimed is:

1. A magnetic recording medium comprising:
   a substrate;
   a ferromagnetic metal layer formed on said substrate; and
   an outer skin layer which is formed on said ferromagnetic metal layer, said outer skin layer comprising a hydrated amorphous cobalt oxide, the X-ray photoelectron spectra of which is characterized in that, in the $CO_{2p}$ spectrum, a ratio of a peak height at 785.9±0.3 eV to that at 780.0±0.3 eV is 40/100 or less when a background (BG) line is drawn between the lower energy side leading edge points of peaks at 780.0±0.3 eV ($2p_{3/2}$) and 795.6±0.3 eV ($2p_{1/2}$) and, in the $O_{1s}$ spectrum, a ratio of a peak height at 529.3±0.4 eV to that at 530.8±0.4 eV is from 100:110 to 100:50 when a background line is drawn between the lower energy side leading edge point and the higher energy side leading edge point of a complex peak at 530.5±2.5 eV which is separated into two component peaks at 529.3±0.4 eV and 530.8±0.4.

2. The magnetic recording according to claim 1, wherein said ferromagnetic metal comprises columnar metal particles.

3. The magnetic recording medium according to claim 2, wherein an inner skin layer of cobalt oxide is formed on said ferromagnetic metal layer below said outer skin layer.

4. The magnetic recording medium according to claim 3, wherein said inner skin layer has a thickness of 100 angstroms and said outer skin layer contains oxygen in an average amount of from about 20 to 50 atomic percent.

5. The magnetic recording medium according to claim 4, wherein said ferromagnetic metal is an alloy of cobalt and nickel and wherein said magnetic recording medium exhibits a stable coefficient of friction and high corrosion resistance.

6. The magnetic recording medium according to claim 1, which further comprises a lubricating layer formed on said outer skin layer.

7. The magnetic recording medium according to claim 6, wherein said ferromagnetic metal layer consists of columnar metal particles, and an inner skin layer of cobalt oxide is formed on said ferromagnetic metal layer below said outer skin layer.

8. The magnetic recording medium according to claim 7, wherein said ferromagnetic metal is an alloy of cobalt and nickel, said inner skin layer has a thickness of 100 angstroms and said outer skin layer contains oxygen in an average amount of from about 20 to 50 atomic percent.

9. The magnetic recording medium according to claim 8, wherein said lubricating layer is from 30 to 500 angstroms in thickness and comprises at least one lubricant selected from the group consisting of aliphatic lubricants, fluorine-containing lubricants, silicones, and hydrocarbons.

10. A method for producing a magnetic recording medium, which comprises forming a ferromagnetic metal layer which contains cobalt on at least one surface of a substrate, subjecting said ferromagnetic metal layer to an atmosphere containing water vapor under a partial pressure of about $10^{-3}$ torr or higher to deposit moisture on the surface of said ferromagnetic metal layer and then oxidizing said ferromagnetic metal in a dry atmosphere.

11. The method according to claim 10, wherein said atmosphere containing water vapor has a relative humidity of from 30% to 80% at room temperature.

12. The method according to claim 11, wherein, after depositing moisture on said ferromagnetic metal layer, the pressure is reduced to 100 torr or lower and then oxidation of said ferromagnetic metal layer is carried out in an atmosphere containing oxygen at partial pressure of higher than 100 torr.

13. The method according to claim 12, wherein said ferromagnetic metal layer is formed on said substrate by vacuum deposition of the metal in the presence of oxygen.

14. The method according to claim 10, which further comprises forming a lubricating layer on said ferromagnetic layer after oxidizing said ferromagnetic metal layer.

15. The magnetic recording medium according to claim 5, wherein said alloy of cobalt and nickel comprises 20% by weight of cobalt and 80% by weight of nickel, and wherein said substrate comprises synthetic resin or a mixture of synthetic resin and inorganic material.

16. The magnetic recording medium according to claim 9, wherein said alloy of cobalt and nickel comprises 20% by weight of cobalt and 80% by weight of nickel, and wherein said substrate comprises synthetic resin or a mixture of synthetic resin and inorganic material.

17. The magnetic recording medium according to claim 1, wherein said ferromagnetic metal layer comprises an alloy selected from the group consisting of a cobalt-nickel alloy, a cobalt-chromium alloy, a cobalt-phosphorous, cobalt-iron alloy, a cobalt-nickel-phosphorous alloy, a cobalt-iron-chromium alloy, and a cobalt-nickel-chromium alloy.

18. The method according to claim 13, which further comprises forming a lubricating layer on said ferromagnetic layer after oxidizing said ferromagnetic metal layer.

* * * * *